Jan. 19, 1943.      R. T. BURNETT      2,308,859
PROCESS FOR MAKING A BRAKE APPLYING ASSEMBLY
Filed April 4, 1940      2 Sheets-Sheet 1

INVENTOR
RICHARD T. BURNETT
BY
*M. W. McConkey*
ATTORNEY

Patented Jan. 19, 1943

2,308,859

UNITED STATES PATENT OFFICE 2,308,859

PROCESS FOR MAKING BRAKE APPLYING ASSEMBLIES

Richard T. Burnett, South Bend, Ind., assignor to Bendix Aviation Corporation, South Bend, Ind., a corporation of Delaware Application April 4, 1940, Serial No. 327,771

3 Claims. (Cl. 29—152.1)

This invention relates to hydraulic brakes and more particularly to the brake actuating part or parts of the hydraulic system and methods for assembling the said brake actuating parts.

An object of my invention is to provide a novel method for fixing a hydraulic wheel cylinder to the parts used for supporting the wheel cylinder and for taking the torque of the brake applications.

Further objects are to develop a method for manufacturing a hydraulic actuator without using a casting operation to form the wheel cylinder; to provide an actuating assembly which is strong and durable although light in weight; and to make possible the formation of such a brake actuating assembly with a minimum of machining operations.

Other objects and advantages of my invention will become evident during the course of the following description of a preferred form thereof, reference being made to the accompanying drawings.

In the drawings, Figure 1 is a section taken through the wheel and brake assembly showing a brake formed in accordance with my improved method described herein and showing in section a hydraulic wheel cylinder associated with the brake;

Figure 1:
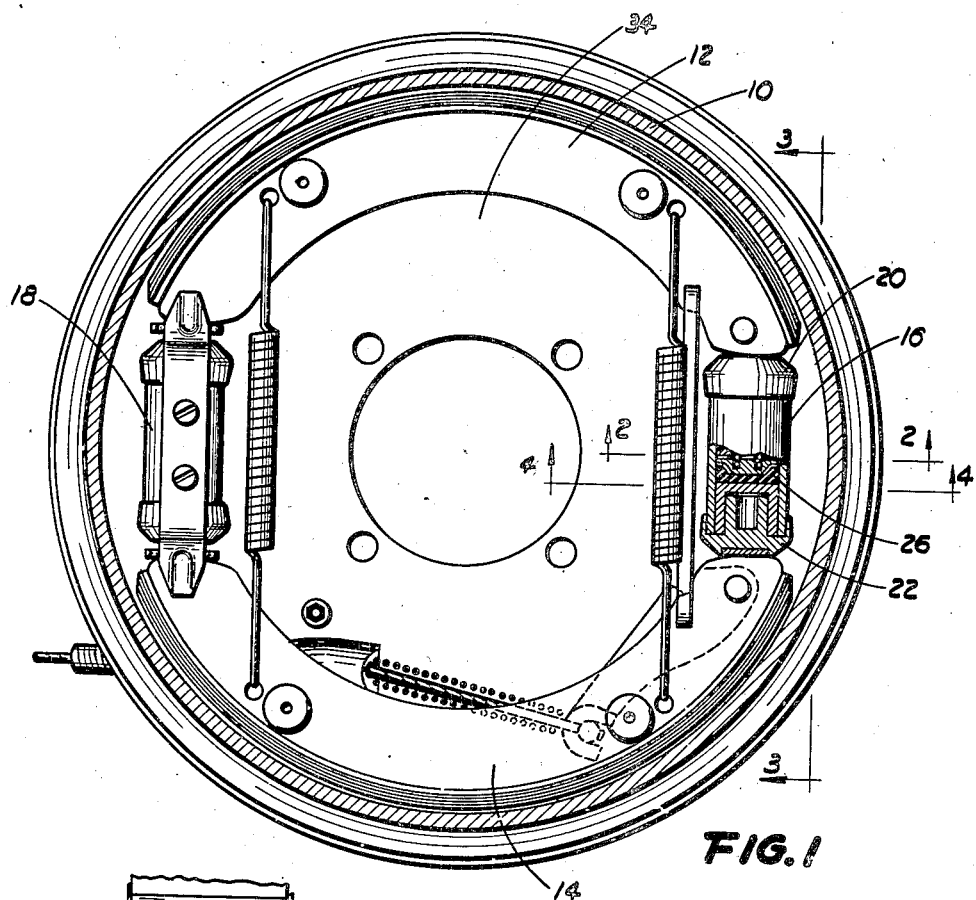

The brake shown in Figure 1 comprises a brake drum 10, brake shoes 12 and 14 for frictionally engaging the drum when braking is desired; and hydraulic wheel cylinders 16 and 18 for actuating the brake shoes. As shown the cylinders are in horizontal alignment and the shoes 12 and 14 are placed at the upper and lower extremities of the stationary brake assembly. It will be recognized, however, that the brake cylinders may be placed in any desired relative position, or one cylinder may be used instead of two without affecting the scope of the invention, since the essence thereof lies elsewhere, as will hereinafter appear.

The cylinders are each provided with pistons 20 and 22 connected to the adjacent ends of the brake shoes, and adapted to be forced outward against the shoe ends in response to the admission of pressure liquid to the wheel cylinders. Resilient seals 24 and 26 are provided in each cylinder for preventing the escape of liquid therefrom.

Inlets 28 and 30 through a nipple 32 are provided for each cylinder, inlet 28 having connected therein a conduit leading from the master cylinder, said conduit being arranged to conduct pressure liquid to the wheel cylinders for actuating the brakes in a manner well known to the art. Inlet 30 is provided for bleeding the hydraulic cylinder and system when desired.

The method of forming and assembling the several parts of the wheel brake assembly will now be described. Inasmuch as the cylinders 16 and 18 and their respective connections, as well as the methods used in forming them, are identical, one cylinder only will be described.

The cylinder 16 is preferably formed of seamless steel tubing, cut to the desired length. This provides a strong, though light, cylinder and eliminates the costly casting operation. However, the cylinder may be cast if desired. If the casting method is used, the nipple 32 may, if desired be cast integral with the cylinder.

For supporting the cylinder 16 and anchoring it against the torque applied to it during actuation of the brakes, I use a stamped backing plate 34, formed and pierced to make it satisfactorily adaptable to my brake assembly. The backing plate is preferably formed with a grooved portion 36 forming a niche into which the cylinder 16 will conveniently fit. The backing plate 34 is pierced, as at 38, to provide an opening through which the nipple 32 (or whatever means may be used to conduct fluid to the cylinder) may contact the wall of the cylinder 16.

The nipple 32 may be cut in the desired shape from rectangular bar stock and then provided with an arcuate inner surface 40, corresponding in curvature to the outer surface of the cylinder 16 and adapted to be secured thereto.

I prefer to secure the nipple to the cylinder before fixing the cylinder to the backing plate. However, this is not essential, as the nipple may, if desired, be secured to the cylinder after the cylinder and backing plate are secured together, or, even, in certain cases, simultaneously therewith. In the modification of my invention shown in Figures 2 and 3, the preferred method is to braze the nipple to the cylinder and then, handling them as a unit, weld them to the backing plate.

In brazing the nipple to the cylinder, I first tack weld them together as shown at 42 and 42a or provide other suitable means for holding them in the proper relative positions during the brazing process. Then copper in any desired form is applied to the common surface of the nipple and cylinder. Copper wires may be placed along the contacting edges of the two pieces. Or the surfaces of the pieces may be covered with a coating of copper powder. Another possible method is the placing of a copper pellet in a hole drilled through the edge of the nipple to meet the surface of cylinder.

The nipple and cylinder, together with the applied copper, are then placed in a furnace having an atmosphere of hydrogen or other reducing gas, and heated to a temperature of approximately 2150° F. At this temperature the copper becomes fluid and is drawn by capillary attraction to cover the surfaces of the nipple and cylinder throughout the contiguous portions of the two pieces. The above described process results in a strong copper bond between the nipple and the cylinder.

I prefer to drill the inlet ports 28 and 30 through the nipple and cylinder after they have been secured together by the brazing process. This assures registration of the openings through the cylinder with their associated openings through the nipple.

The drilling of the inlet ports 28 and 30 may, however, be done in other ways. The openings in the cylinder and the openings in the nipple may be separately drilled before assembly. Or the openings in the nipple may be drilled before assembly, and the openings in the cylinder drilled thereafter in registration with the nipple openings.

The unitary cylinder and nipple assembly is next welded to the backing plate 34. In this step the surfaces of the parts to be welded together are placed in contact, meeting along the lines indicated at 44 and 44a and further shown by the series of crosses on the drawings. Heat is then applied to the contacting surfaces of the parts to be secured together. Under the applied heat and pressure (pressure may be applied to aid the process) the molecules of one part mingle with and attach themselves to the molecules of the other part, so as to make an integral block or assembled unit. The result is a strong connection between backing plate and cylinder, making a light and durable unit, though inexpensively formed.

Figures 2, 3:
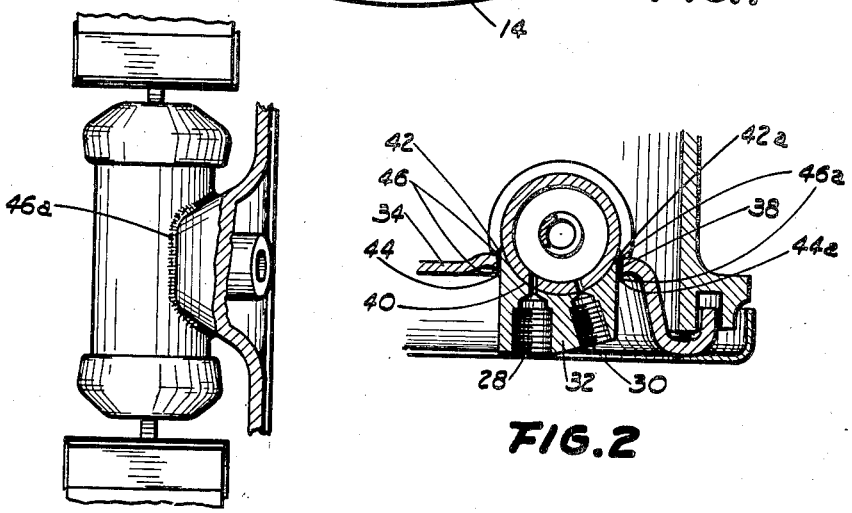
Figure 2 is a section taken on the line 2—2 of Figure 1.
Figure 3 is a section taken on the line 3—3 of Figure 1.

It will be noted that, in the form of my invention shown in Figures 2 and 3, the end of the nipple meets the cylinder at substantially the same point at which the backing plate meets the cylinder and nipple unit. The result of the welding process, therefore, will be to fuse or unite all three surfaces, as shown at 46 and 46a, and thus make an even more substantial union between nipple and cylinder than existed before. The three parts, backing plate, nipple and cylinder are solidly integrated along the line of welding.

The method of welding used may be varied without affecting the result of the method described herein. Flame or torch welding, electric welding, hydrogen arc welding—any desired welding process may be used. It is not believed that a specific explanation or description of the method of welding is necessary here, as the different welding processes are old and well known to those skilled in the welding art.

Since the welding is done after the brazing and confined to the end line of surface contact, neither of the welding or brazing steps will tend to undo or affect the results obtained by the other step.

The machining of the cylinder interior to provide a smooth surface and one in which pistons 20 and 22 will reciprocate satisfactorily may be done either before or after the consummation of the above-described steps in the assembling process. It will probably be preferable, however, to perform the necessary finishing operations, whether reaming, grinding or whatever machining process is desired, after the cylinder and nipple have been secured together, and also subsequent to the integration of the cylinder and/or nipple to the backing plate.

Figure 4:
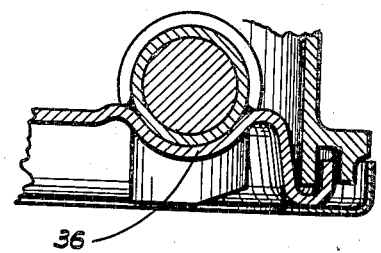
Figure 4 is a section taken on the line 4—4 of Figure 1.
Figure 5:
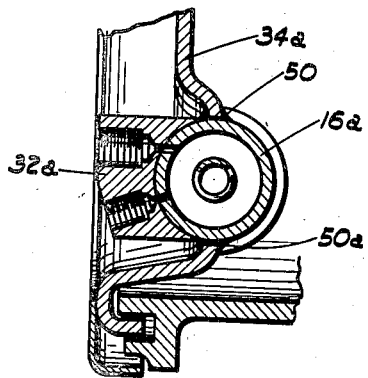
Figure 5 shows in section a modification of the cylinder, backing plate, nipple assembly of Figure 2.
Figure 7:
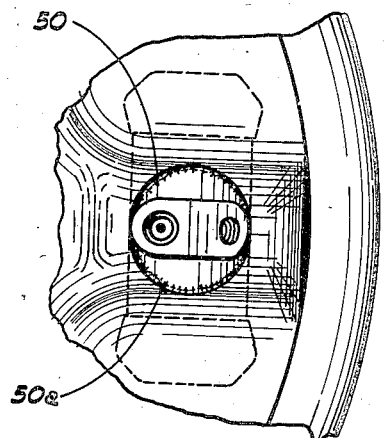
Figure 7 is a side view of the cylinder shown in Figures 5 and 6.
Figure 6:
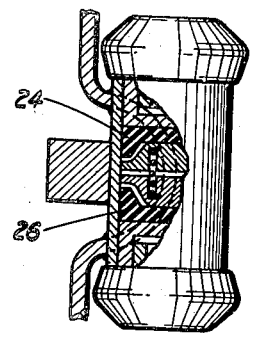
Figure 6 is a plan view of the assembly shown in Figure 5.

In Figures 5, 6 and 7, I have shown a modification of my invention. It will be noted that, in Figure 5, the cylinder, which is designated 16a, is welded to the backing plate 34a along the surface indicated by the numerals 50 and 50a and the series of crosses. The nipple 32a may be secured to the cylinder either before or after the cylinder is welded to the backing plate, but the edge of the nipple is not welded to the backing plate and to the side of the cylinder as in the case of Figures 2, 3 and 4. In the modification of Figures 5, 6 and 7 approximately half of the cylinder extends through the backing plate at the point where the backing plate extends farthest forward, which is halfway between the two ends of the cylinder.

Figure 8:
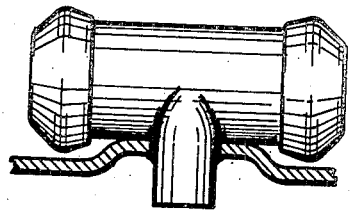
Figures 8 and 9 show in section further modifications of the wheel cylinder, backing plate and nipple assembly.

In Figure 8, a further modification is shown in which the cylinder does not have a surface adjacent the backing plate. The nipple instead of the cylinder is, therefore, welded to the backing plate and the nipple and cylinder may either be cast together as a single piece, or may be secured together in any desired way. It will be seen that the braking torque of this assembly will be transmitted through the block or nipple to the backing plate.

Figure 9:
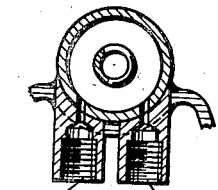

The modification of Figure 9 has two nipples 56 and 58 in place of the single nipple of the other cylinders shown. The fluid inlet may be connected through one and the bleeder passage may be provided in the other. The parts are to be assembled in the same manner as heretofore described.

In the foregoing specification, I have described a preferred form of my wheel brake assembly and methods of making the same. Modifications in both the assembly and the method will be apparent to those skilled in the art. It is, therefore, to be understood that my patent is not limited to the embodiments described herein or otherwise than by the terms of the appended claims.

I claim:

1. A process for making a brake applying assembly comprising stamping a torque receiving backing plate cover for a brake drum with an offset portion, piercing and forming an aperture in the offset portion to receive a brake cylinder and nipple at their common line of intersection, forming and machining a cylinder to extend on both sides of the said aperture, forming and machining a nipple to extend on both sides of the said aperture, assembling the said members including the backing plate cover and brake cylinder and nipple, and then simultaneously and unitarily welding the said members together at the said intersection of the said members.

2. A process for making a brake applying assembly comprising stamping a torque receiving backing plate cover for a brake drum with an offset portion, piercing and forming an aperture in the offset portion to receive a brake cylinder and nipple, cutting a tube to the desired length to form a cylinder to extend on both sides of the said aperture, forming and machining a nipple to extend on both sides of the said aperture, assembling the said members including the backing plate cover and brake cylinder and nipple, and then simultaneously and unitarily welding the said members together at the said intersection of the said members.

3. A process for making a brake applying assembly comprising stamping a torque receiving backing plate cover for a brake drum with an offset portion, piercing and forming an aperture in the offset portion to receive a brake cylinder and nipple, forming and machining a nipple to set against the surface of the cylinder which extends through the backing plate to the outside thereof, and welding the said members including the backing plate and brake cylinder and nipple together to form an unitary assembly.

RICHARD T. BURNETT.